United States Patent [19]

Schopp

[11] 4,179,142
[45] Dec. 18, 1979

[54] FLEXIBLE PIPE FITTING

[76] Inventor: Edgar Schopp, 2210 Gratton St., Riverside, Calif. 92504

[21] Appl. No.: 803,426

[22] Filed: Jun. 6, 1977

[51] Int. Cl.² ............................................. F16L 33/00
[52] U.S. Cl. .................................... 285/239; 285/291; 285/390; 285/423
[58] Field of Search ............... 285/423, 355, 174, 390, 285/288, 48–54, 289, 239, 290, 291; 138/109, 174

[56] References Cited

U.S. PATENT DOCUMENTS

| 408,600 | 8/1889 | Erickson | 285/53 |
|---|---|---|---|
| 1,895,022 | 1/1933 | Chandler | 285/53 |
| 2,069,141 | 1/1937 | Furlong | 285/423 X |
| 3,224,795 | 12/1965 | Conley | 285/289 X |
| 3,614,137 | 10/1971 | Jacobson | 285/390 |
| 3,843,169 | 10/1974 | Wise | 285/423 |

FOREIGN PATENT DOCUMENTS 813583 5/1959 United Kingdom ............... 285/423

Primary Examiner—Dave W. Arola
Attorney, Agent, or Firm—Harvey S. Hertz

[57] ABSTRACT

A pipe fitting is formed of a flexible body having a threaded coupling section at one end thereof. The coupling section has a portion integrally formed with the flexible body. A rigid shape-retaining portion is juxtaposed with the coupling section for enabling the coupling section dimensions to remain relatively constant when a member is secured to a threaded portion of the coupling section.

2 Claims, 3 Drawing Figures

FLEXIBLE PIPE FITTING

BACKGROUND OF THE INVENTION

1. Field of the Invention

The field of art to which the invention pertains includes the field of flexible pipe fittings for lawn sprinkler systems, particularly, with respect to a pipe fitting having a rigid shape-retaining portion formed in the coupling section of the pipe.

2. Description of the Prior Art

In U.S. Pat. No. 3,759,455, there is illustrated a flexible pipe fitting which is used to interconnect a sprinkler and a pipe line and is usable to prevent damage and injury in the event the sprinkler or sprinkler riser is accidentally struck. The fitting is formed of a flexible tube with end members secured to opposite ends of the tube which form coupling sections for interconnecting the fitting to sprinkler heads or additional pipes. One difficulty with the aforementioned device is that the interconnection between the tube and the end members is such that a reduced interior bore is formed and pop-up type sprinkler heads do not have sufficient clearance to move in the junction area. Additionally, it has been found that the interconnection of the end members of the flexible tube tends to fail after a period of useage. One technique for improving the aforementioned fitting has been to integrally mold the end members and the flexible tube from a single type of material. However, by making the end members which form a thread coupling section of the same flexible material as the flexible tube, typically, i.e. PVC (polyvinyl chloride), it has been found that the sprinkler head threaded portion tends to deform the threaded coupling section. Additionally, it has been found that even after threading the coupling section to a device, if sufficient force is exerted on this junction, the threaded end of the coupling section can deform and be physically removed from the device.

In order to overcome the attendant disadvantages of prior art flexible fittings, the present invention provides an integrally formed body and coupling section and a rigid shape-retaining portion in the coupling section. The shape-retaining portion enables the coupling section to remain relatively constant when a member is secured to the threaded portion of the coupling section or when a force is exerted on the coupling section or the member secured thereto. Thus, separation of the coupling section and the adjacent structure to which it is secured, such as an additional pipe or a sprinkler head, is prevented.

SUMMARY OF THE INVENTION

A pipe fitting comprises a flexible body having a threaded coupling section at one end thereof. The coupling section has a portion integrally formed with the flexible body. A rigid shape-retaining portion is juxtaposed with the coupling section for enabling the coupling section dimensions to remain relatively constant when a member is secured to a threaded portion of the coupling section.

The advantages of this invention, both as to its construction and mode of operation, will be readily appreciated as the same becomes better understood by reference to the following detailed description when considered in connection with the accompanying drawings in which like reference numerals designate like parts throughout the Figures.

DESCRIPTION OF THE PREFERRED EMBODIMENTS

Figure 1:
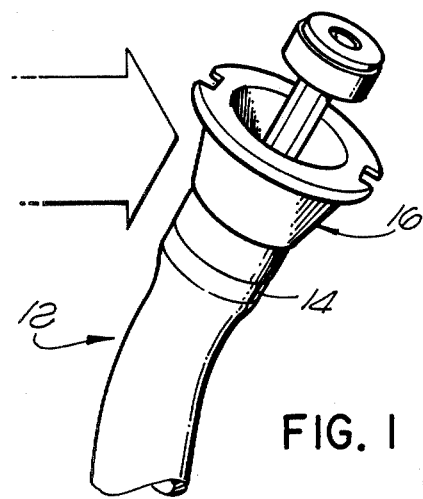
FIG. 1 is a perspective view of a portion of the pipe fitting illustrating forces normally subjected thereto.

Referring now to FIG. 1, there is shown a pipe fitting 12 constructed in accordance with the principles of the invention and illustrated to show the use thereof. The pipe fitting 12 includes a threaded coupling section 14 having a pop-up sprinkler head 16 secured thereto. Additionally, another coupling section (not shown) is normally integrally formed with the other end of the pipe fitting 12. When a force, illustrated by an arrow in FIG. 1, is applied to the pipe fitting 12 or the sprinkler head 16 secured thereto, the pipe fitting flexes and prevents breakage of the pipe fitting at a coupling section or an intermediate portion thereof. Typically, the force illustrated by the arrow can be a lawn mower, a person's foot kicking the fitting, or other forces normally present on a lawn or other place where the sprinkler head 16 is utilized.

Figure 2:
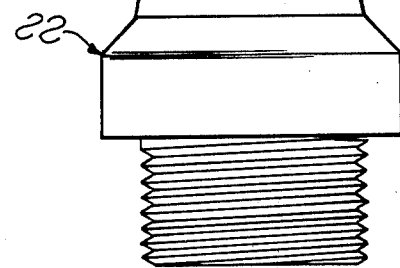
FIG. 2 is a partial cross-sectional view of a portion of the pipe fitting if FIG. 1.

Referring now to FIG. 2, the pipe fitting 12 is shown in partial cross section in order to explain the details of the invention. Typically, the pipe fitting 12 would be made of flexible molded material such as PVC and is formed of a flexible body 18 having the coupling section 14 integrally molded with one end thereof and a second coupling section 22 integrally molded at the other end thereof.

A uniform bore 24 extends on the lengthwise interior of the flexible body and continues through the coupling sections. A rigid shape-retaining ring 26 which will be described in greater detail hereinafter is positioned in the interior of the coupling section adjacent the end 28. The interior surface 32 of the ring 26 forms a continuation of the bore 24. The ring 26 is normally made of a rigid type material and is initially placed on a mandrel (not shown) whose outer surface defines the dimensions of the bore 24 and the fitting 12 is then molded on the mandrel and around the ring 26. Normally, a shape-retaining ring (not shown) is also placed in the coupling section 22 and is indentical to the ring 26 illustrated in the coupling section 14 of FIG. 2.

The coupling section 14 includes an outwardly extending conventional gripping flange 34 adjacent the area defining the interconnection between the flexible body 18 and the coupling section 14. The surface from the end 28 of the coupling section 14 to the flange 34 is normally formed of threads 36 formed on the coupling section exterior surface enabling a device such as the sprinkler head 16 of FIG. 1 to be threadably secured thereto.

The shape-retaining ring 26 is made of material which can reinforce the coupling section interior adjacent the threads 36. Typically, the material for the ring can be made of steel or other hard metal or wood or other plastic material. One sucessful material used to form the rigid shape-retaining ring is commonly referred to a ABS (Acrylonitrile-Butadine-Styrene) and is manufactured by Borg Warner under the trade name "Cycolac".

Figure 3:
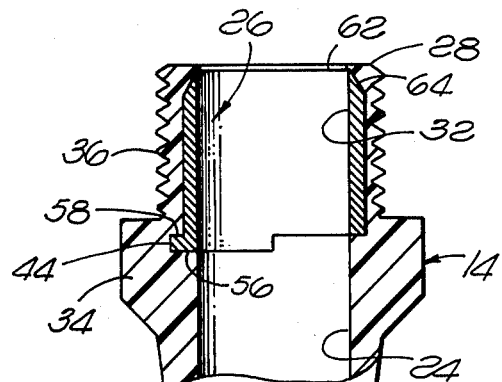
FIG. 3 is a perspective view of a shape-retaining member used in the device of FIGS. 1 and 2.
Figure 3:
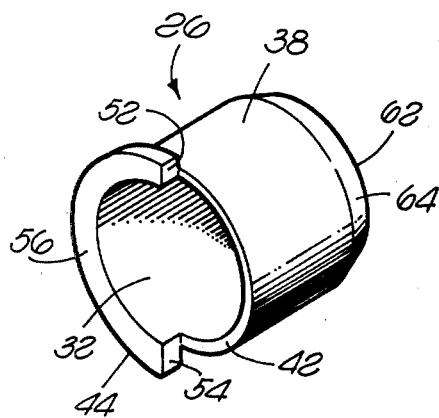

The rigid shape-retaining ring 26 is shown in greater detail in FIG. 3 and is formed of a sleeve 38 whose interior surface 32 forms a continuation of the flexible body bore 24. At the sleeve end 42 a partial outwardly extending flange 44 is integrally formed with the annular sleeve. As illustrated in FIG. 3, the partial flange 44 is shown as a half arc although lesser or greater arc lengths could be used as well. When the pipe fitting 12 is molded around the ring 26, portions of the coupling section 14 adjacent the flange free ends 52 and 54 abut these ends and prevent the sleeve from rotating about the pipe fitting bore 24 axis. Additionally, the bottom surface 56 of the flange and the top surface 58 of the flange 44 also are juxtaposed with the molded adjacent portions of the coupling section thus preventing movement of the shape-retaining ring along the bore 24 axis.

The other end 62 of the annular sleeve has a tapered surface 64 around which the coupling section front end 28 is molded and further prevents movement of the ring 26 along the bore 24 axis should the partial flange 44 of the ring fail. In addition, as can be seen in FIG. 2, the rigid shape-retaining ring is positioned on the interior of the coupling section adjacent to the threaded end 36. The threaded end 36 is prevented from deforming when a sprinkler head 16 of FIG. 1 or other device is secured thereto. Moreover as previously mentioned, without the retaining ring 26, the flexible material adjacent the threaded end 36 can deform sufficiently to allow separation of a member secured thereto.

I claim:

1. A pipe fitting comprising:
   a flexible body having a threaded coupling section at one end thereof;
   said coupling section having a portion thereof integrally formed with said flexible body and wherein a continuous bore is formed in said flexible body and said coupling section; and
   a rigid shape-retaining portion defining a portion of said continuous bore, said rigid shape-retaining portion including an annular sleeve whose inner surface defines a portion of said continuous bore and whose outer surface and terminal ends are juxtaposed with said coupling section enabling said coupling section dimensions to remain relatively constant when a member is secured to the threaded portion of said coupling section, said coupling section being molded around the outer surface and terminal ends of said rigid shape-retaining portion, said rigid shape-retaining portion further including at one terminal end a partial arc section flange extending radially outwardly from said outer surface and having radially extending ends defining the limit of said partial arc section flange, said flange formed on said annular sleeve in a plane intersecting the axis of said bore for preventing movement of said sleeve with respect to said flexible body in a direction parallel to the axis of the bore, said molded portion of said coupling section being juxtaposed with said radially extending ends of said flange for preventing said rigid shape-retaining portion from rotating about said bore axis.

2. A pipe fitting in accordance with claim 1 wherein the terminal end of said rigid shape-retaining portion opposite said one terminal end is tapered toward said bore surface.

* * * * *